United States Patent

[11] 3,619,490

[72] Inventor Setsuo Usui
Kanagawa-ken, Japan

[21] Appl. No. 803,388
[22] Filed Feb. 28, 1969
[45] Patented Nov. 9, 1971
[73] Assignee Sony Corporation
Tokyo, Japan
[32] Priority Mar. 1, 1968
[33] Japan
[31] 43/13268

[54] COLOR IMAGE PICKUP DEVICE
4 Claims, 8 Drawing Figs.

[52] U.S. Cl. .......... 178/5.4 ST, 313/108 B
[51] Int. Cl. .......... H04n 9/06
[50] Field of Search .......... 178/5.2, 5.4, 5.4 ST

[56] References Cited

UNITED STATES PATENTS

| | | | |
|---|---|---|---|
| 2,853,547 | 9/1958 | Perilhou | 178/5.4 ST |
| 3,001,051 | 9/1961 | Tait | 178/5.4 ST |
| 3,300,580 | 1/1967 | Takagi et al. | 178/5.4 ST |

*Primary Examiner*—Robert L. Griffin
*Assistant Examiner*—Richard P. Lange
*Attorneys*—Albert C. Johnston, Robert E. Isner, Lewis H. Eslinger and Alvin Sinderbrand

ABSTRACT: In a color image pickup device a banded color filter and a lens screen are interposed between an object to be televised and the photosensitive conversion layer of an image pickup tube to provide a striped color-separated image of the object on the photosensitive layer, with the color filter at a finite distance in front of the lens screen and with the distance from the lens screen to the layer being selected in relation to such finite distance, the pitch of the lens elements making up the lens screen and the pitch of the filter elements of the banded color filter, so that images of the color filter are overlappingly projected on the photosensitive conversion layer for optimum brightness and contrast of the reproduced picture.

INVENTOR.
SETSUO USUI

BY

ATTORNEY

INVENTOR.
SETSUO USUI

BY

ATTORNEY

INVENTOR.
SETSUO USUI

BY

ATTORNEY

INVENTOR
SETSUO USUI

BY

ATTORNEY

INVENTOR.
SETSUO USUI

BY Lewis H. Eslinger
ATTORNEY

COLOR IMAGE PICKUP DEVICE

This invention relates generally to a color image pickup device, and more particularly to a color image pickup device which is particularly suited for use in color television cameras employing one or more color image pickup tubes.

It has heretofore been proposed to generate color video signals by color image pickup devices of the type in which a color-separated image of an object to be televised is produced on the photoconductive layer of an image pickup tube by a color filter consisting of a plurality of color filter elements of different wavelength band characteristics and by a lens screen made up of a large number of lens elements, for example, as disclosed in copending applications for U.S. Letters Patent, Ser. Nos. 646,045 and 657,139, now Pat. No. 3,502,799 filed June 14, 1967 and July 31, 1967, respectively, and assigned to the assignee hereof. In these devices, color separation of the image of the object to be televised requires the use of an optical system by which an image of a color filter is projected on the lens screen through an objective lens and many color filter images are formed on the photoconductive layer by the lens elements, for example, cylindrical lenses, of the lens screen. However, such optical system has disadvantages such as changes in the focus of the filter image upon shifting of the objective lens and a low rate of utilization of light as a whole so that the brightness and contrast of the reproduced picture are adversely affected. Further, difficulties are encountered in the design of the optical system, that is, in the selection of a pattern of the color filter, the F-number and thickness of the lens elements of the lens screen, the F-number of the objective lens and in the relative arrangements of the filter, lens screen and objective lens and so on.

Accordingly, an object of this invention is to provide a color image pickup device which ensures enhanced brightness and contrast in the reproduced picture.

Another object is to provide a color image pickup device in which a color filter is interposed between an objective lens and a lens screen and color filter images are overlappingly projected on the photoconductive layer of an image pickup tube.

Still another object of this invention is to provide a color image pickup device in which a virtual image of a color-separated image of an object to be televised is produced by a color filter and a lens screen consisting of many concave cylindrical lenses and is projected by another lens means onto the photoconductive layer of an image pickup tube.

In accordance with an aspect of this invention, the color filter is disposed in front of the lens screen with no lens interposed therebetween, that is, at a finite distance in front of the lens screen, and the distances from the lens screen to the color filter and to the photosensitive conversion layer of the image pickup tube are selected in relation to the pitch of the filter elements and the pitch of the lens elements making up the lens screen to cause such lens elements to form many superimposed color filter images on the conversion layer.

The above, and other objects, features and advantages of this invention, will be apparent in the following detailed description of illustrative embodiments which is to be read in conjunction with the accompanying drawings, in which.

Figure 4:
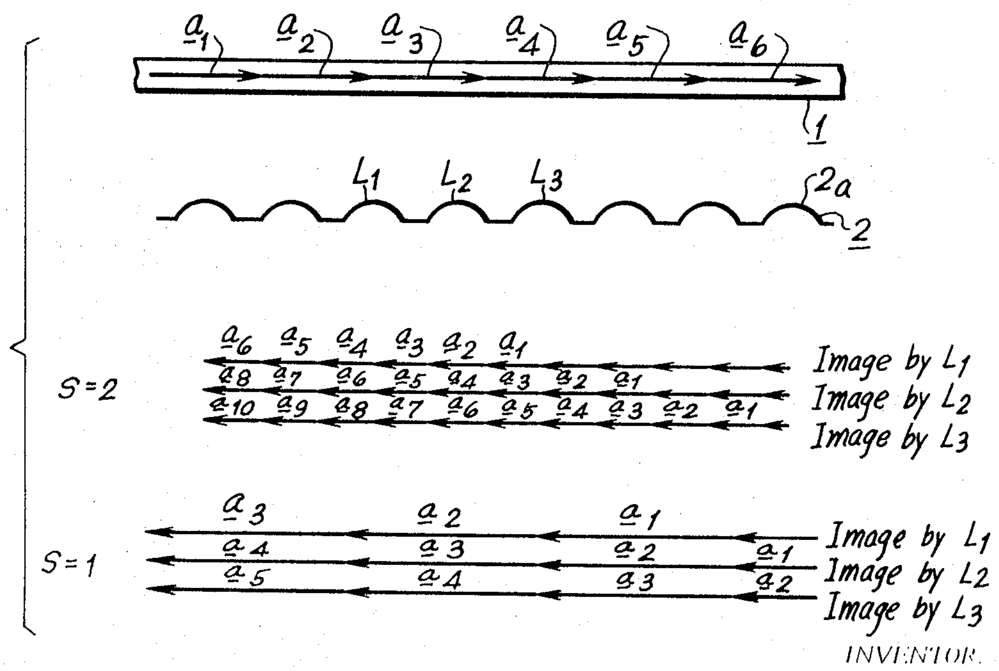
Figures 5, 6:
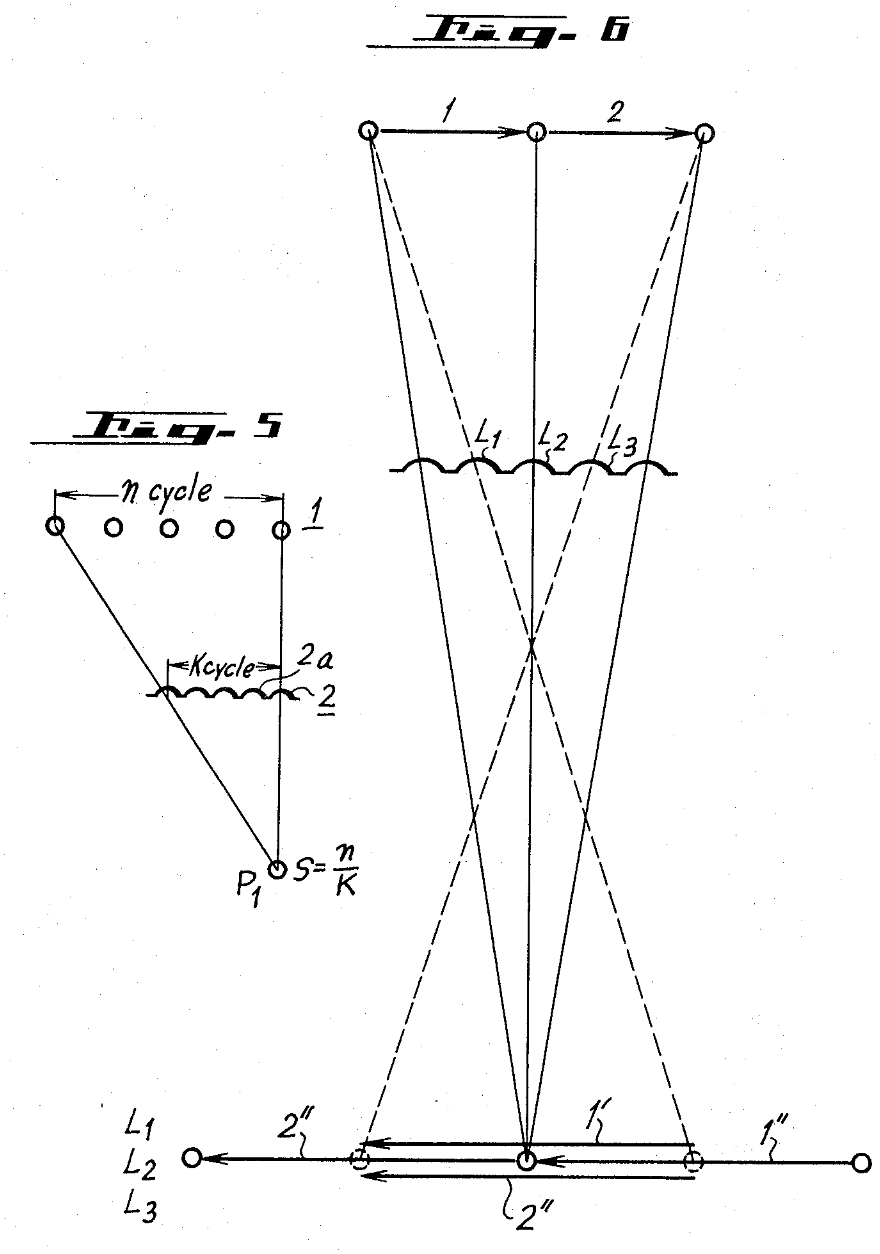
Figure 7:
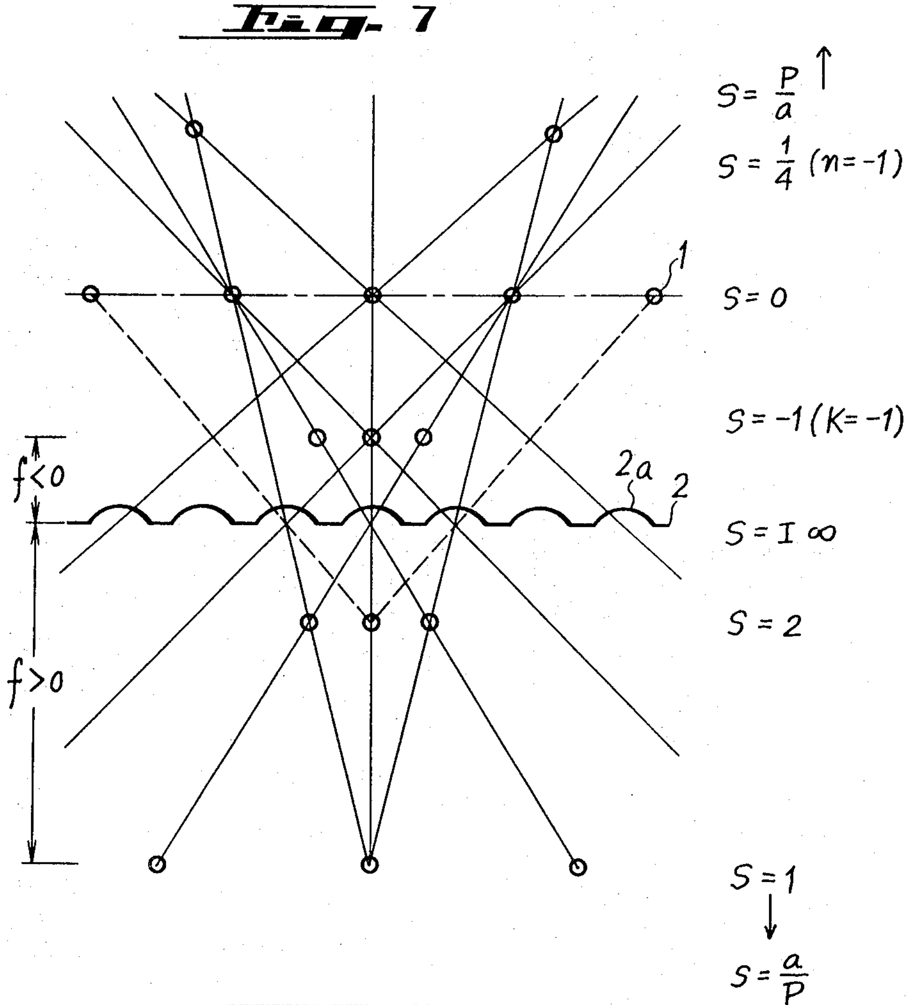

FIG. 4 schematically shows the phase relation of overlapping projected images of the color filter;

FIGS. 5 to 7 are schematic diagrams, for explaining the present invention; and

Figure 8:
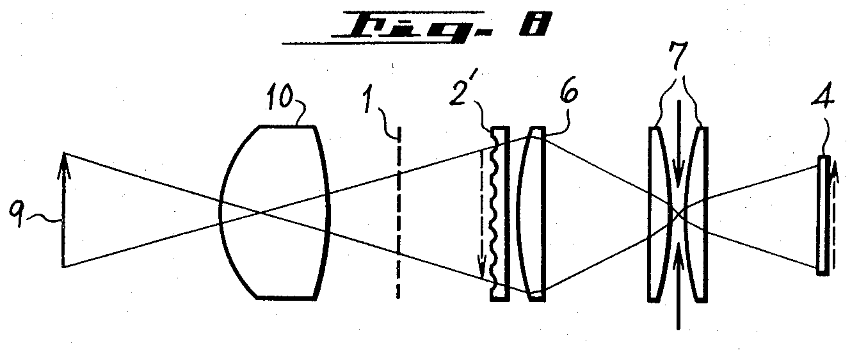

FIG. 8 schematically illustrates an optical system for use in an embodiment of this invention where virtual images of the color filter are projected.

Figure 1:
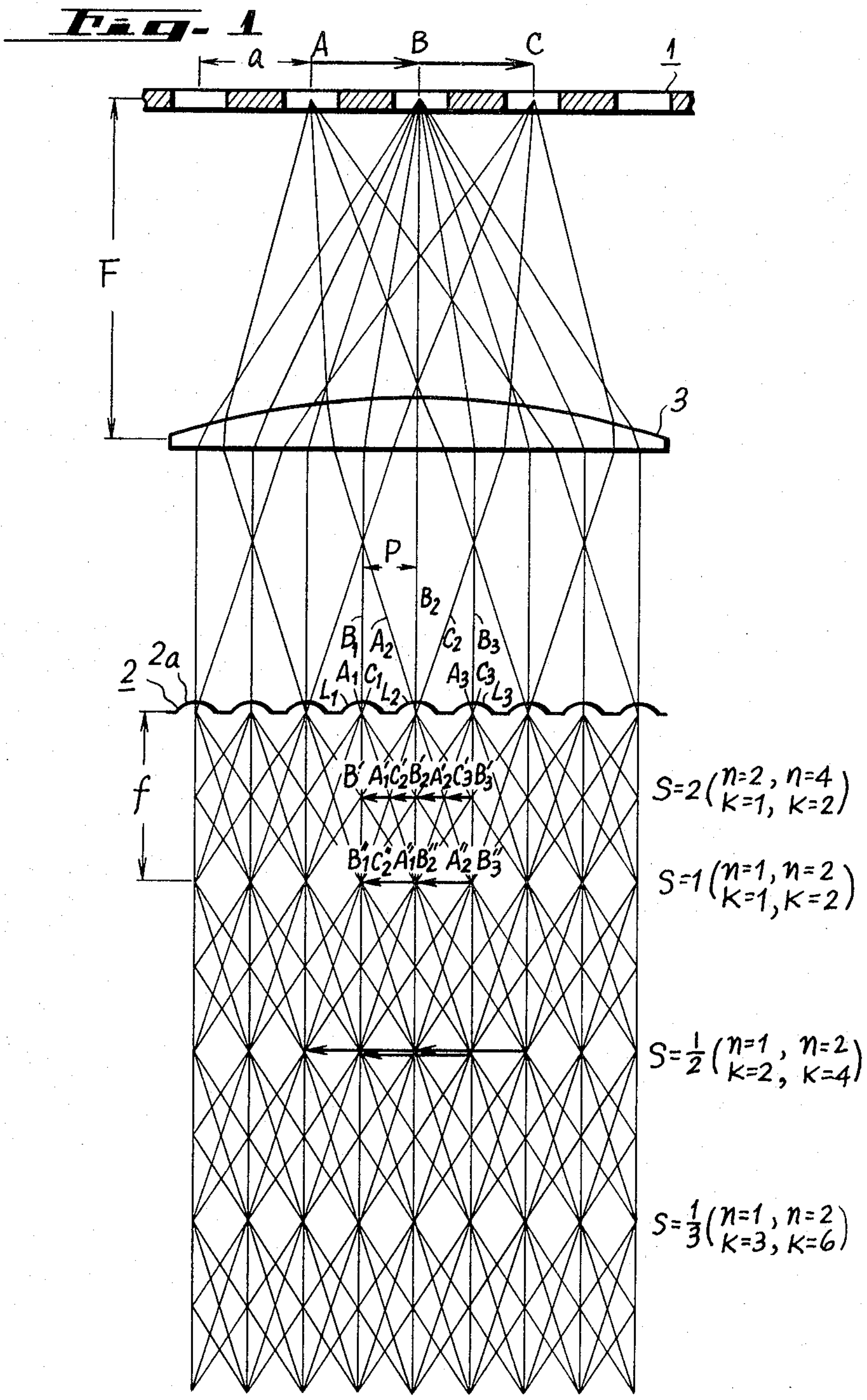
FIG. 1 is a schematic diagram showing light paths from a color filter in an arrangement referred to in explaining the invention.

Referring to FIG. 1 in detail, it will be seen that, in a color image pickup device as previously proposed, and in which a plurality of color video signals are derived from one image pickup tube, a lens screen 2 consisting of many cylindrical lenses 2*a* is disposed in back of a banded color filter 1 with the cylindrical lenses extending parallel to the filter elements of the color filter. In such case, banded color filter 1 is spaced from lens screen 2 by a distance greater than the focal length thereof, or as shown on FIG. 1, a collimator lens 3 is interposed between banded color filter 1 and lens screen 2. The banded color filter 1 is located at the position of the forward focus of collimator lens 3 and a virtual image of color filter 1 is produced by the collimator lens 3 at an infinite distance in front thereof. With the foregoing arrangement, it has been considered to use an optical system by which a real image of color filter 1 is produced by lens screen 2 substantially on its image plane, that is, on the photoconductive layer of an image pickup tube (not shown). More specifically, with such optical system, light emanating from the object (not shown) passes through a main lens (not shown) and then through banded color filter 1, collimator lens 3 and lens screen 2, in that order. This optical system may be replaced by an optical system in which light from the object first reaches the banded color filter and thence passes through the main lens, the collimator lens and the lens screen. In the latter case, if the color filter is disposed at the position of the forward focus of the main lens, the collimator lens may be omitted. These two optical systems are the same in principle and, in each, the width of each repeating cycle of the image of the banded color filter is made to exactly agree with one pitch of the lens elements of the lens screen on the photoconductive layer. To this end, the focal length $f$ of each of cylindrical lenses 2*a* making up lens screen 2, the pitch P of the cylindrical lenses, the focal length F of collimator lens 3 and the pitch $a$ of the color filter elements of the color filter 1 are selected to bear the relation: $P/f=a/F$. However, this imposes a severe limitation on the construction of the described optical systems for the following reasons. The types of electric systems provided for the color signals and luminance signals may require the mentioned parameters to have different values. Thus, a phase separation method or a frequency separation method may require different parameters and further, the parameters may vary with a desired spatial frequency of image patterns on the photoconductive layer of the image pickup tube, the thickness of the face plate of the tube and so on. For example, when using a vidicon tube having an aperture of 2.5 cm., the focal length $f$ of each cylindrical lens is 3.0 mm., the pitch P of the cylindrical lenses ranges from 100 to 200 microns and an inverse number of the aperture ratio, that is, the so-called F-number of the lens screen 2 is in the range of 15 to 30, and consequently, the brightness of the objective lens is low. Even with a brighter objective lens, if each image of the color filter formed by each cylindrical lens is projected onto the photoconductive layer of the vidicon tube at an area corresponding to only one pitch of the cylindrical lenses of the lens screen, light corresponding to the width of only one pitch of the color filter elements is utilized, and hence the rate of utilization of light is extremely low.

In order to make more effective use of the brightness of the objective lens, the image of the color filter may be projected by each cylindrical lens onto the photoconductive layer at an area corresponding to several pitches of the cylindrical lenses. As shown on FIG. 1, collimator lens 3 causes rays of light emanating from an object to be televised, and passing through a point A of the color filter 1, to enter individual cylindrical lenses $L_1$, $L_2$ and $L_3$ of the lens screen at the same angle to the optical axes. The same is true of rays of light passing through points B and C of the color filter 1. Further rays passing through the cyclic points A, B, c,...on the color filter 1 are converged or overlapped at one point on the optical axis of each cylindrical lens 2*a* in the plane indicated at S=1. Such overlapping projection by the individual cylindrical lenses takes place not only on their optical axes but also at points spaced distances P, 2P,...therefrom, where P is the pitch of the cylindrical lenses, with the result that the images of the color filter 1 formed by the individual cylindrical lenses $L_1$, $L_2$, $L_3$,...are projected one on another while being displaced an integral multiple of $2\pi$ apart in phase. In FIG. 1 reference characters $A_1$, $A_2$, $A_3$,...,$B_1$, $B_2$, $B_3$,...and $C_1$, $C_2$, $C_3$,...respectively indicate rays of light emanating from points A, B and C on color filter 1 and passing through the cylindrical lenses $L_1$, $L_2$, $L_3$,.... In this case, the focal length $f$ of each cylindrical lens $2a$ of lens screen 2 is selected to be equal to the distance between the photoconductive layer of the image pickup tube used and lens screen 2, and color separation is achieved by projecting a color filter image corresponding to one repeating cycle of the filter elements onto the photoconductive layer 4 for each of the cylindrical lenses of lens screen 2.

Contrary to the above, in accordance with the present invention, a plurality of banded color filter images are overlappingly projected on the photoconductive layer for each of the cylindrical lenses, thereby to provide an enhanced rate of utilization of light or enhanced brightness in the reproduced picture.

As will be apparent from FIG. 1, the overlapping projection takes place not only at the plane $S=1$ but also at the planes indicated as $S=2$, $S=3$....or $S=1/2$, $S=1/3$ and which are parallel with the plane of lens screen 2. If the focal depth of lens screen 2 is made infinite and image formation is possible at any position in the image space, the photoconductive layer of the image pickup tube may be located in any plane other than that indicated at $S=1$. In the plane of, for example, $S=2$, each color filter image corresponding to one cycle $a$ of the filter elements is projected at an area corresponding to one-half of the pitch P of the lens element $2a$. This implies that the spatial frequency of the color filter images is twice that in the plane $S=2$ as in the plane $S=1$, or conversely that the width of the color filter elements of the color filter 1 may be doubled for the formation of color filter images of the same spatial frequency. In practice, however, since the depth of focus of lens screen 2 is not sufficient to form color filter images in both planes $S=1$ and $S=2$, the images are formed in one or the other of the planes and there is no substantial difference in the manner of the overlapping projection. Similarly, the overlapping projection in the planes $S=3$, 4....is substantially the same as that on the plane of $S=1$, but the overlapping projection is a little different on planes $S=1/2$, 1/3....where S is not an integer. As will be apparent from an examination of the light paths in FIG. 1, the color filter images are focused in the plane of $S=1/2$ by the respective cylindrical lenses $2a$ in overlapping relation while being displaced $\pi$ apart in phase, so that contrast is very poor in the reproduced picture. Further, in the plane $S=1/3$, the color filter images are formed while being displaced 120° apart in phase, in which case, poor contrast also results.

Figure 2:
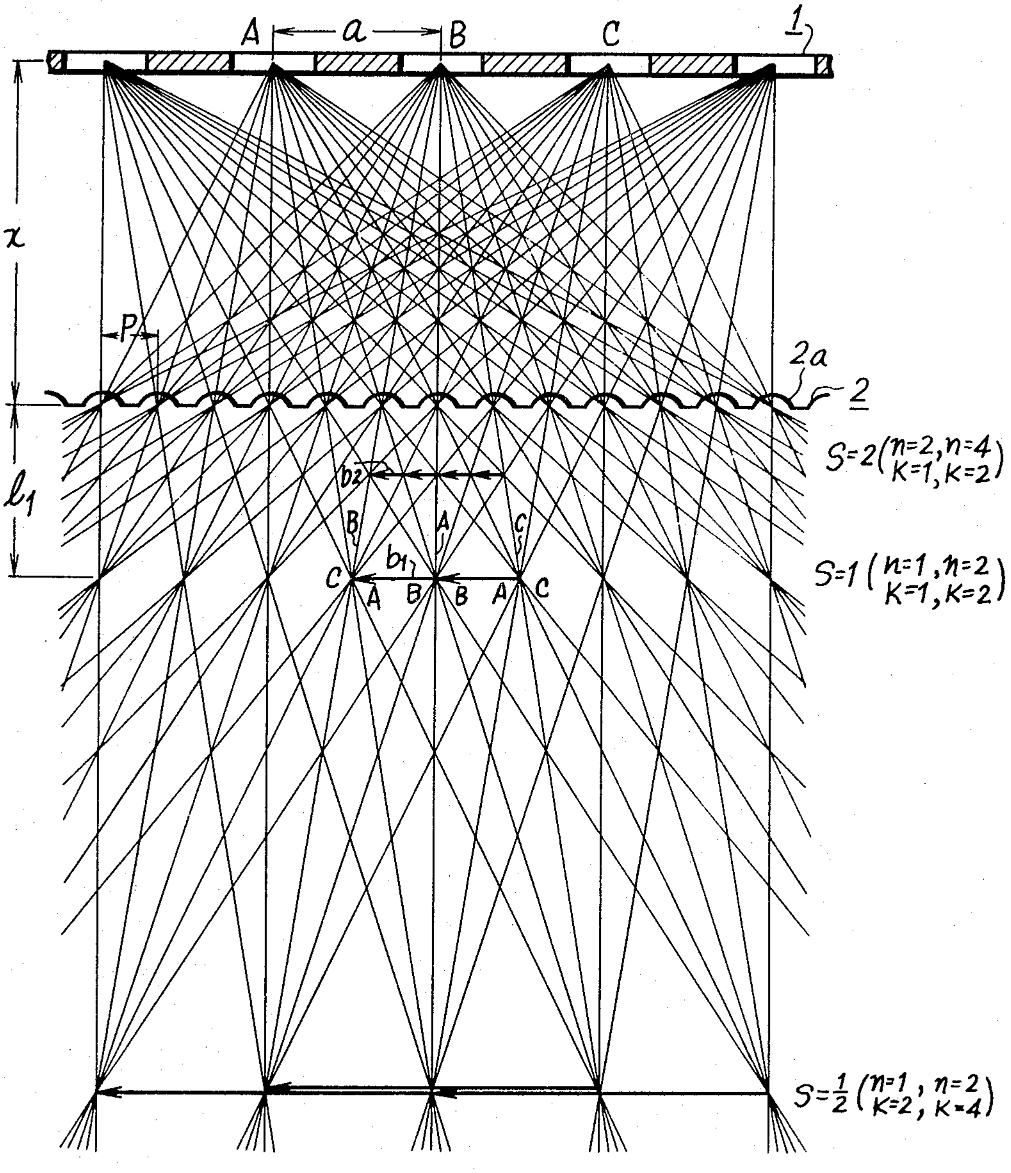
FIG. 2 is a schematic diagram showing light paths from a color filter disposed at a finite distance in front of the lens screen.

The foregoing description has referred to the case where the banded color filter 1 is placed substantially infinitely in front of the lens screen 2, but the overlapping projection may also take place when the color filter is located at a finite distance from the lens screen 2. FIG. 2 shows light paths in this latter case, in which the distance from the lens screen 2 to the banded color filter 1 is pulp, by $x$ and the distance from the lens screen 2 to the image plane is indicated at $l$. In this case, too, there are planes $S=1$, 2, 3,....1/2, 1/3....in which the overlapping images are formed as in the case of FIG. 1. In this specification S is referred to as an overlapping degree.

Figure 3:
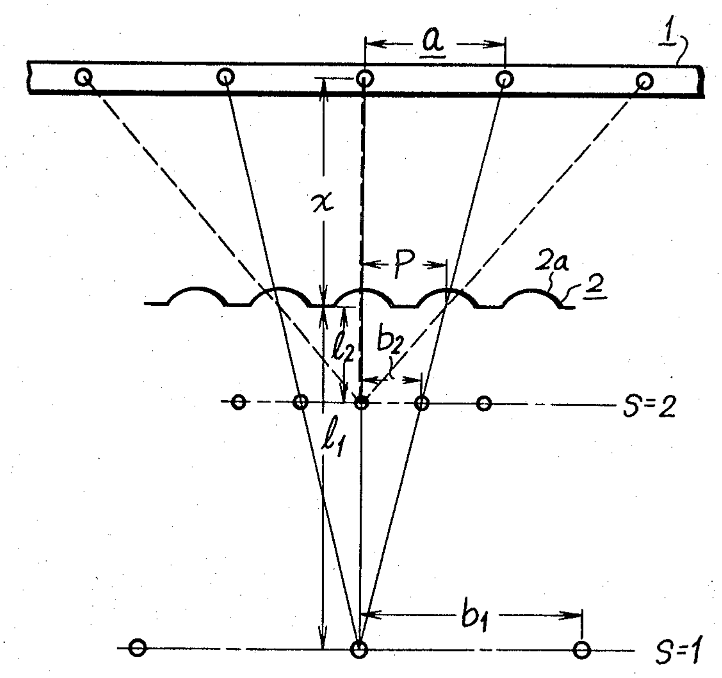
FIG. 3 is a schematic diagram illustrating a portion of FIG. 2.

FIG. 3 shows the manner in which hickory projection is attained in the planes $S=1$ and $S=2$ of FIG. 2. The rays of light from the color filter 1 which are superimposed at a point in the plane $S=1$ after passing through the individual cylindrical lenses $2a$, as indicated by full lines, originate at points on color filter 1 that are spaced apart by the distance $a$, that is, the width of the color filter over which a cycle of different color filter elements extends. However, in the case of the plane $S=2$, the rays of light passing through the individual cylindrical lenses $2a$ emanate from the color filter at intervals of two cycles $(2\times a)$ of the filter elements as indicated by dotted lines. Thus, the overlapping degree S is defined by the following equation:

$S=n/K$ 1.

where $n$ and K respectively represent the periodicities of the color filter elements of color filter 1 and of the lens elements of lens screen 2. That is, as shown on FIG. 5, when color filter 1 is viewed from one cyclic point $P_1$ in the image plane, lines extending from point $P_1$ through cylindrical lenses which are spaced from each other by K×P will reach color filter 1 at points spaced from each other by $n\times a$.

As illustrated diagrammatically in FIG. 4, the color filter images $a_1$,....$a_n$ formed by the respective cylindrical lenses $L_1$, $L_2$, $L_3$....of the lens screen 2 are overlapped in the image plane of $S=1$ while being displaced $2\pi$ apart in phase, and the images are overlapped on the image plane of $S=2$ while being displaced $4\pi$ apart in phase. Thus, $S=n/K$ is proportional to the displacement in phase in the image plane of the overlapped color filter images from the several cylindrical lenses. The phase difference $\Delta\theta$ is given by the following equation:

$\Delta\theta=2\mu\cdot n/K=2\mu S$ 2.

When S is not an integer and is, for example, $S=1/2$, the color filter images are overlapped while being displaced 180° apart in phase as shown in FIG. 6 and accordingly contrast is very poor and the photoconductive layer of the image pickup tube cannot be located in that plane in practice. The same is true of the case where the color filter is placed infinitely in front of the lens screen 2, as shown in FIG. 1. It will be readily understood that color filter images of optimum contrast can be produced only when the overlapping degree S is an integer, that is, when the overlapped images are out of phase by an integral multiple of $2\pi$.

The pitch $a$ of the filter elements of the color filter 1, the distance $x$ from the lens screen 2 to the color filter 1, the pitch P of the cylindrical lenses of the lens screen 2, the distance $l_2$ (optical path length/refractive index) from the lens screen 1 to the image plane (the photoconductive layer 4) and the pitch $b_s$ of the overlapping images bear the following relation ($S=1$, 2, 3,....and −1, −2, −3,....)

$$l_s=\frac{Px}{Sa-P} \quad (3)$$

$$\frac{b_s+1}{b_s}=\frac{Sa-P}{(S+1)a-P} \quad (4)$$

$$b_s=\frac{P}{Sx}(x+l_s)=\frac{aP}{aS-P} \quad (5)$$

$$S=P\left(\frac{1}{b_s}+\frac{1}{a}\right) \quad (6)$$

These equations can be readily derived but were proved experimentally.

In the arrangement of FIG. 1, there is no substantial difference in the manner of overlapping projection on the image planes of $S=1$, 2, 3,....,but, in the arrangement shown on FIG. 2, the overlapping projection is slightly different for each of the image planes of $S=1$, 2, 3,....in that the contrast of the overlapping images becomes higher with an increase in the value of the overlapping degree S.

In order to prove this, it is necessary to examine how all rays of light from the color filter are distributed over the image plane.

Assuming that, when the banded color filter is irradiated by light from the object to be televised, light of a width $aM$ is effectively used, namely that the overlapping value on the photoconductive layer is M at the center thereof. If the number of the cylindrical lenses $2a$ of the lens screen is taken as N, then the number of all the light paths on the photoconductive layer 4 is given by the following equations:

$M=(S-\beta-\gamma)L+\beta(L+1)+\gamma(L-1)$....(7)

but when $\beta=0$ and $\gamma=0$, 1, 2,....$S-1$ or $\gamma=0$ and $\beta=0$, 1, 2,....$S-bq$, the number T of the rays of light is as follows:

$$T=MN=(S-\beta-\gamma)\left[L(N-L+1)+2\sum_{q=1}^{L-1}q\right]+\beta\left[(L+1)(N-L)+2\sum_{q=1}^{L}q\right]+\gamma\left[(L-1)(N-L+2)+2\sum_{q=1}^{L-2}q\right] \quad (8)$$

where N>M. The first terms within the three sets of brackets in equation (8) represent the quantity of light at the central area of the photoconductive layer, and the second terms within the brackets represent the quantity of light at the peripheral area of the photoconductive layer. Thus, equation (7) is correct ethylene the quantity of light only at the central area but, in practice, the quantity of light at the peripheral area is different because the color filter is assumed to be a perfect diffusing surface ($F$-number=0). It will be understood that the color filter images will be lacking in uniformity of contrast on the photoconductive layer unless the color filter mg., produced in such a manner as to provide $\beta=\gamma=0$ in the equation (7). However, even if $\beta=\gamma$ 0, there is no problem is a large value is selected for L so that L, L+1, and L−1 are all approximately equal to each other.

There will now be described how to determine the contrasts of the overlapping images on the image planes of suspension 1, 2, 3,....in the case of $\beta=\gamma=0$. The contrast of the overlapping images is regarded as the intensity of overlapping impulse images on the values planes. Assuming that the quantity of light corresponding to the width of the pitch P of each cylindrical lens forms an impulse These of light not $i_s$ and that a repeating cycle $b_s$ is obtained on the image plane of the overlapping degree S, then, if $S$=1 in equation (8), when $M=L$ $$T=M(N-M+1)+2\sum_{q=1}^{M-1}q$$

and the quantity of light of the overlapping impulse images at the central area is as follows:

$I_1=Mi_1$ 9.

However, if $S$=2, when $M=2L$, the light intensity of the overlapping impulse images is as follows:

$$I_2=\frac{M}{2}i_2 \quad (10)$$

Since $i_2$ represents light focused closer to the surface of the lens screen than $i_1$, it is naturally more intense and its intensity is given as follows:

$$i_2=i_1\frac{b_1}{b_2}=i_1\frac{2a-P}{a-P} \quad (11)$$

Accordingly, it follows from equation (10) that $$I_2=Mi_1\left(\frac{2a-P}{2a-2P}\right)>Mi=I_1$$

and $$\frac{1}{b_2}=\frac{2a-P}{a-P}\cdot\frac{1}{b_1}\geqq 2\frac{1}{b_1}\,(a>P)$$

This indicates that, on the image plane of $S$=2, the spatial frequency is increased more than twice that on the image plane of $S$=1, thereby to provide for enhanced contrast.

The same is not true of the case where the color filter is located substantially infinitely in front of the lens screen as exemplified in FIG. 1. This is due to the fact that, if $x$ is infinite, $$b_s=\frac{P}{S}$$

$$\therefore\frac{b_s+1}{b_s}=\frac{S}{S+1} \quad (12)$$

and $$I_2=\frac{Mi_1}{2}\cdot\frac{2}{1}=Mi_1=I_1$$

As has been described in the foregoing, the features or advantages resulting from locating the color filter at a finite distance from the lens screen, with no lens therebetween, are as follows:

(1) Overlapping color filter images having a pitch $b_S$ different from the pitch P of the lens element of the lens screen can be produced, as established by equation (5); and (2) The contrast can be increased by selecting a large value for the overlapping degree S.

As described above, the overlapping degree $S=n/K$ is saturated by the periodicity $n$ of the banded color filter and the periodicity K of the cylindrical lenses of the lens screen. The foregoing description has been given only in connection with the case where S>0.

The overlapping degree S will now be discussed in connection with all rational numbers therefor.

In accordance with the above definition for S, it will be readily seen that $S=\infty$ on the surface of the lens screen 2 and that $S$=0 on the surface of the color filter 1, as shown in FIG. 7. Further, FIG. 7 shows that, for image planes in back of the lens screen 2, the overlapping degree gradually decreases in such an order as $S$=....2, 1, 1/2,....and that an image plane of $S=a/p$ is formed infinitely in back of the lens screen. On the other hand, an image plane of $S=P/a$ exists infinitely in front of lens screen 2 and, as the color filter 1 is approached from that plane, the overlapping degree S gradually decreases and becomes zero in the plane of the color filter 2. The value of the overlapping degree S will now be considered for situations where the image plane lies between the color filter 1 and the lens screen 2. Further, such consideration will assume that $n$ is positive when the color filter lies forwardly of the overlapping image plane, that $n$ is negative when the filter lies rearwardly of the image plane, that K is positive when the lens screen lies in front of the overlapping image plane and that K is negative when the lens screen lies to the rear of the image plane. In the case of the foregoing assumptions, the overlapping degree S is negative when the overlapping image plane lies between the lens screen 2 and the color filter 1. Even when the overlapping degree S is negative, equations (3) to (6) are applicable, but, however, the overlapping image is a virtual one. When the overlapping degree S is negative, it is necessary to use a lens screen 2′ consisting of concave cylindrical lenses, as shown on FIG. 8. Since the color filter image is a virtual image, color separation by such overlapping requires that a field lens 6 be disposed near the back of the lens screen 2′ consisting of concave cylindrical lenses, and further that a relay lens 7 be placed in back of field lens 6 at a moderate distance therefrom to project a real image on the photoconductive layer 4 of the image pickup tube, as depicted in FIG. 8. Further, in FIG. 8, reference numeral 9 indicates an object to be televised and a main lens is indicated at 10.

When the overlapping degree S is negative, an overlapping image plane of good contrast and high spatial frequency can be obtained, and a further advantage of this arrangement is that, since the image plane of the object is close to the color filter, that is, between the lens screen 2′ and the color filter 1, diffraction due to the color filter is low.

The present invention is particularly applicable to the production of color signals with the so-called luminance separation system.

It will be apparent that many modifications and variations may be effected without departing from the scope of the novel concepts of this invention.

What is claimed is:

1. In a color image pickup device having image pickup means with a photosensitive conversion layer, a single banded color filter with a plurality of color filter elements of different wavelength band-pass characteristics and which are sequentially arranged in order in a repeating cycle, and a lens screen consisting of a plurality of lens elements, the banded color filter and the lens screen being interposed between an object to be televised and said conversion layer to provide on the latter a striped color-separated image of the object; the improvement comprising disposing said single color filter at a finite distance $x$ from said lens screen, and disposing said lens screen at a distance $l_s$ from said conversion layer which is in accordance with the equation $$l_s=\frac{Px}{Sa-P}$$

in which, P is the pitch of each of said lens elements of the lens screen, $a$ is the width of said repeating cycle of the color filter elements of said banded color filter, and S is an integer equal to the ratio $n/K$ where $n$ and K are respectively the periodicities of said color filter elements and of said lens elements, whereby many color filter images are overlappingly projected on said conversion layer of the image pickup means.

036193514 2. A color image pickup device according to claim 1, in which S is a positive integer, and said lens elements have a positive focal length.

3. A color image pickup device according to claim 1, in which S is a negative integer, and said lens elements have a negative focal length.

4. A color image pickup device according to claim 1, in which S is a negative integer, said lens elements have a negative focal length to project virtual images of said color filter in a plane between said lens screen and said color filter, and further lens means are provided to project real overlapped color filter images on said conversion layer.

* * * * *